(12) United States Patent
Toyoda et al.

(10) Patent No.: US 9,309,429 B2
(45) Date of Patent: Apr. 12, 2016

(54) INK JET RECORDING APPARATUS

(71) Applicant: Seiko Epson Corporation, Tokyo (JP)

(72) Inventors: Naoyuki Toyoda, Suwa (JP); Masaru Terada, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/698,323

(22) Filed: Apr. 28, 2015

(65) Prior Publication Data

US 2015/0315397 A1    Nov. 5, 2015

(30) Foreign Application Priority Data

May 1, 2014    (JP) .................. 2014-094416

(51) Int. Cl.
| | |
|---|---|
| *G01D 11/00* | (2006.01) |
| *C09D 11/38* | (2014.01) |
| *B41J 2/21* | (2006.01) |
| *B41J 2/045* | (2006.01) |

(52) U.S. Cl.
CPC ............. *C09D 11/38* (2013.01); *B41J 2/04573* (2013.01); *B41J 2/2107* (2013.01)

(58) Field of Classification Search
CPC .......................... B41J 2/2107; B41J 2/04573
See application file for complete search history.

(56) References Cited

U.S. PATENT DOCUMENTS

2005/0264728 A1 * 12/2005 Funahata .......... G02F 1/133555
                                                    349/114
2013/0250003 A1    9/2013 Nariai et al.

FOREIGN PATENT DOCUMENTS

| JP | 2013-199034 A | 10/2013 |
|---|---|---|
| JP | 2013-227454 A | 11/2013 |

* cited by examiner

*Primary Examiner* — Julian Huffman
(74) *Attorney, Agent, or Firm* — Nutter McClennen & Fish LLP; John J. Penny, Jr.

(57) ABSTRACT

Provided is an ink jet recording apparatus including: a base metal pigment ink composition; and a first nozzle that ejects the base metal pigment ink composition, in which the base metal pigment ink composition contains a flat base metal pigment of which a 50% average particle diameter D50 is in a range of 100 nm to 1 μm, and an organic compound of which a surface tension at 20° C. is 35 mN/m or greater, and an ejection interval T1 after the base metal pigment ink composition is ejected from the first nozzle and before the base metal pigment ink composition is ejected again from the first nozzle is within 100 μs.

10 Claims, 4 Drawing Sheets

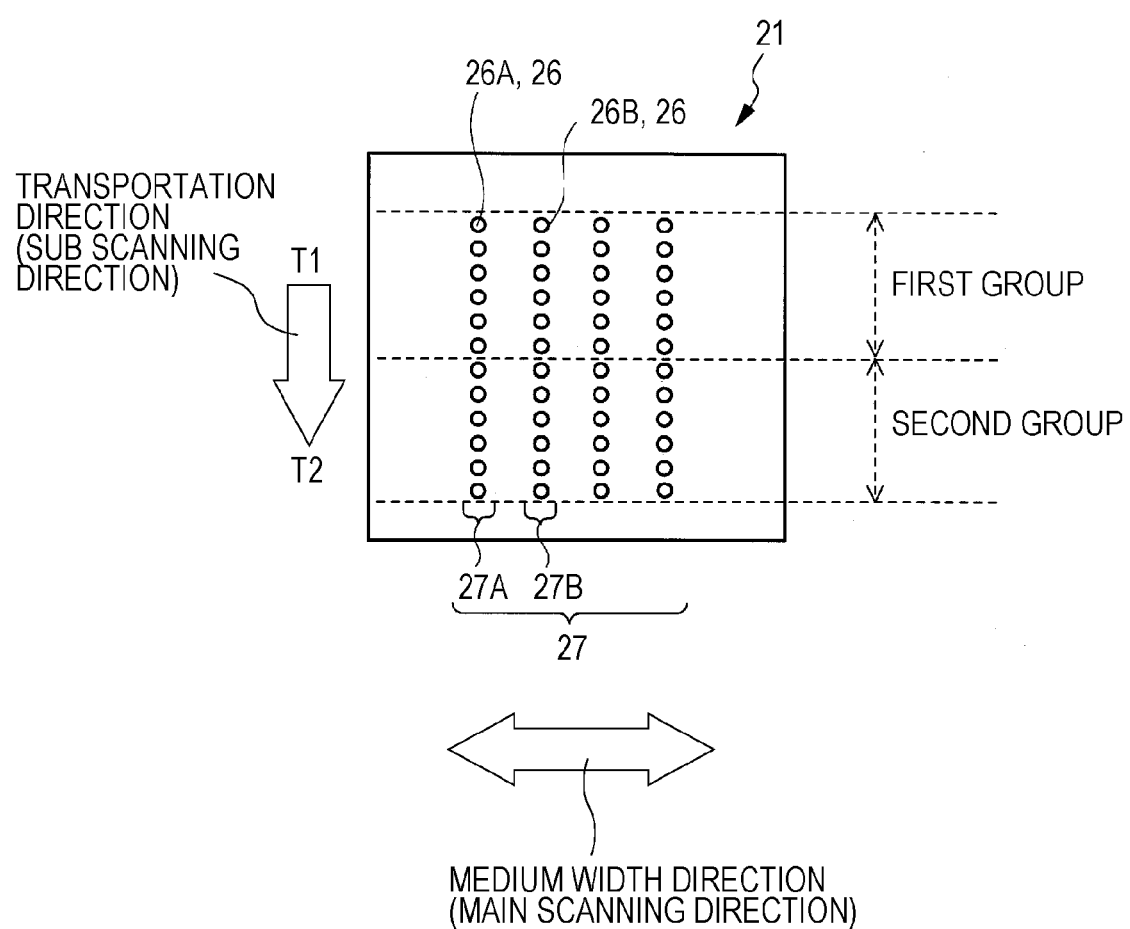

INK JET RECORDING APPARATUS

BACKGROUND

1. Technical Field

The present invention relates to an ink jet recording apparatus.

2. Related Art

In the related art, as a method of forming a coated film having metallic luster on printed matter, foil stamp printing using print ink including gold dust or silver dust manufactured from brass or aluminum fine particles as a pigment or a metal foil, a heat transfer system using a metal foil, or the like has been used. However, according to the method, the forming of fine patterns or the application thereof to a curved surface portion is difficult. In addition, during the foil stamp printing, on-demand performance is low, the support for the multi-product production is difficult, and metal tone printing having gradation cannot be performed.

Therefore, various application examples of the ink jet printing are presented, and as an application example, metallic printing is performed, development of the ink having metallic luster has progressed. The ink jet method is excellent in that the method can be applied to the forming of a fine pattern or the recording on a curved surface portion. As the metallic ink used in the ink jet method, ink for ink jet recording that contains a metal pigment (scale-like pigment) such as an aluminum is disclosed in JP-A-2013-227454 and JP-A-2013-199034.

The metal pigment disclosed in the patent document described above may present uneven behavior in the ink jet recording apparatus or in a portion near the nozzle of the ink jet head, caused by the special shapes or particle diameters thereof. In this case, the flowability of the ink containing the metal pigment in the ink jet recording apparatus decreases and thus the ejection of the ink becomes unstable. Particularly, as the interval of the ejection time of the ink ejected from a specific nozzle decreases, the decrease in the ejection stability of the ink becomes considerable.

SUMMARY

An advantage of some aspects of the invention is to provide an ink jet recording apparatus that can realize excellent ejection stability even if the ejection interval of the ink is caused to be short.

The invention can be realized in the following forms or application examples.

APPLICATION EXAMPLE 1

According to an aspect of the invention, there is provided an ink jet recording apparatus including: a base metal pigment ink composition; and a first nozzle that ejects the base metal pigment ink composition, in which the base metal pigment ink composition contains a flat base metal pigment of which a 50% average particle diameter D50 is in a range of 100 nm to 1 μm, and an organic compound of which a surface tension at 20° C. is 35 mN/m or greater, and an ejection interval T1 after the base metal pigment ink composition is ejected from the first nozzle and before the base metal pigment ink composition is ejected again from the first nozzle is within 100 μs.

According to the ink jet recording apparatus in Application Example 1, even if the ejection interval of the ink is short, within 100 μs, excellent ejection stability (waveform responsiveness) can be realized.

APPLICATION EXAMPLE 2

In the ink jet recording apparatus according to Application Example 1, a difference between a 90% average particle diameter D90 of the base metal pigment and a 10% average particle diameter D10 of the base metal pigment (D90−D10) may be in a range of 0.1 μm to 0.8 μm.

APPLICATION EXAMPLE 3

In the ink jet recording apparatus according to Application Example 1 or 2, a 90% average particle diameter D90 of the base metal pigment may be in a range of 0.3 μm to 1.2 μm.

APPLICATION EXAMPLE 4

The ink jet recording apparatus according to any one of Application Examples 1 to 3 may further include a color ink composition containing a colorant and a second nozzle that ejects the color ink composition, the colorant may be a dye, or a pigment in which a 50% average particle diameter D50 is 400 nm or less, and when an ejection interval after the color ink composition is ejected from the second nozzle and before the color ink composition is ejected again from the second nozzle is referred to as T2, a ratio between T1 and T2 (T1:T2) may be in a range of 0.7:1 to 1:0.7.

APPLICATION EXAMPLE 5

In the ink jet recording apparatus according to any one of Application Examples 1 to 4, a diameter of the first nozzle may be 30 μm or less.

APPLICATION EXAMPLE 6

In the ink jet recording apparatus according to any one of Application Examples 1 to 5, the ink jet recording apparatus may be a line-type ink jet recording apparatus that causes one of a recording head or a recording medium to be fixed and scans the other so as to record an image on the recording medium, and the first nozzle, and a second nozzle that ejects a color ink composition containing a colorant which is a dye, or a pigment having a 50% average particle diameter D50 of 400 nm or less may be installed on different recording heads, and arranged in a direction of the scanning.

APPLICATION EXAMPLE 7

In the ink jet recording apparatus according to any one of Application Examples 1 to 5, the first nozzle and a second nozzle that ejects a color ink composition containing a colorant which is a dye, or a pigment having a 50% average particle diameter D50 of 400 nm or less may be installed on the same recording head, the recording head may include a first nozzle array and a second nozzle array and performs scanning in a main scanning direction, the first nozzle array may contain the first nozzle, and a plurality of nozzles that eject the base metal pigment ink composition may be arranged in a sub scanning direction intersecting the main scanning direction, the second nozzle array may contain the second nozzle, and a plurality of nozzles that eject the color ink composition may be arranged in the sub scanning direction, and the first nozzle array and the second nozzle array may be used in a divided manner for every groups including a predetermined number of nozzles in the sub scanning direction.

APPLICATION EXAMPLE 8

In the ink jet recording apparatus according to any one of Application Examples 1 to 7, the organic compound may be at least one of a heterocyclic compound and an active energy ray polymerizable compound.

APPLICATION EXAMPLE 9

In the ink jet recording apparatus according to any one of Application Examples 1 to 8, the content of the organic compound may be 5% by mass or greater with respect to a total mass of the base metal pigment ink composition.

APPLICATION EXAMPLE 10

In the ink jet recording apparatus according to any one of Application Examples 1 to 9, the base metal pigment may be a pigment subjected to a surface treatment with a fluorine-based compound, and the fluorine-based compound may contain fluorine, and at least one selected from the group consisting of phosphorus, sulfur, and nitrogen, as constituent elements.

BRIEF DESCRIPTION OF THE DRAWINGS

The invention will be described with reference to the accompanying drawings, wherein like numbers reference like elements.

FIG. 3 is a diagram schematically illustrating a nozzle surface of a recording head of the serial printer.

DESCRIPTION OF EXEMPLARY EMBODIMENTS

Figure 1:
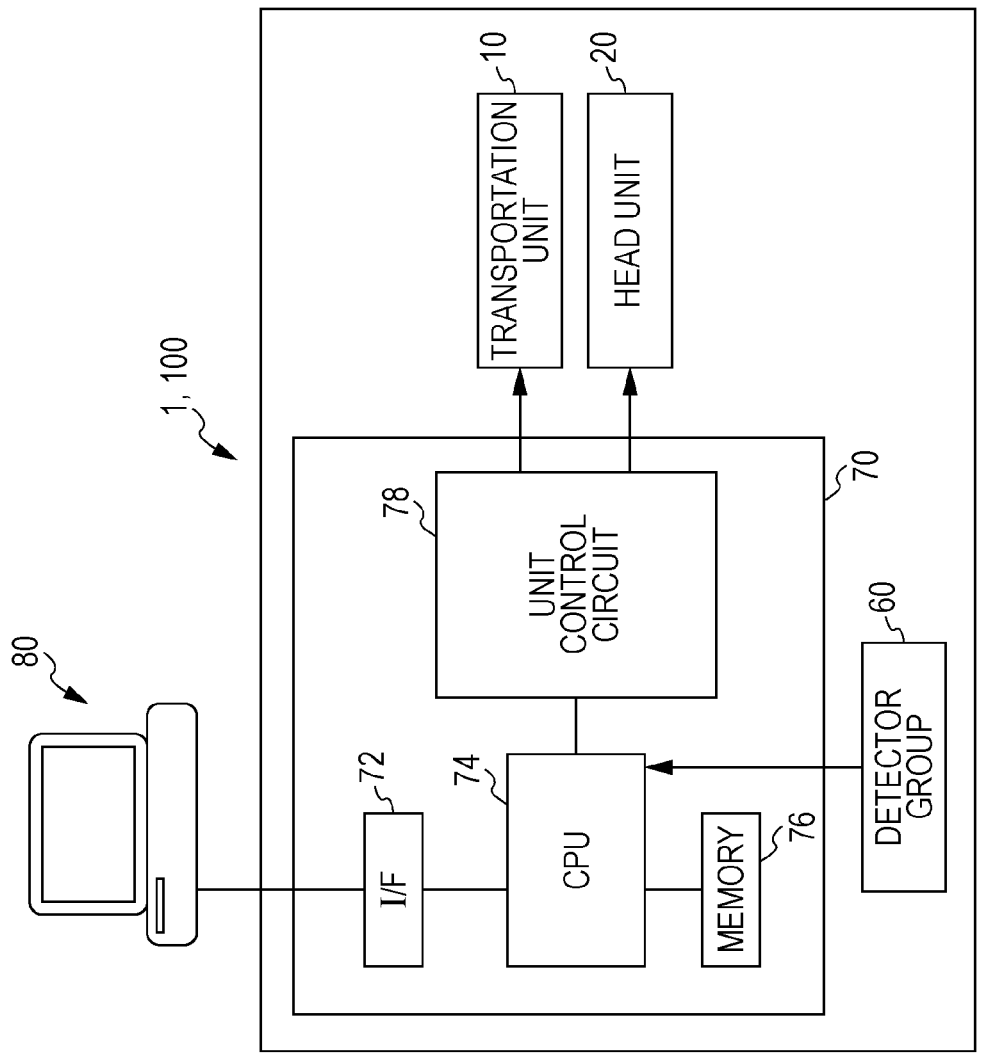
FIG. 1 is a block diagram illustrating a configuration of an ink jet recording apparatus according to an embodiment of the invention.

Hereinafter, the preferred embodiments of the invention are described. The embodiments described below provide examples of the invention. The invention is not limited to the embodiments below, and includes examples of various modifications without departing from the gist of the invention.

The ink jet recording apparatus according to an embodiment of the invention includes a base metal pigment ink composition and a first nozzle that ejects the base metal pigment ink composition, and the base metal pigment ink composition contains a flat base metal pigment of which a 50% average particle diameter D50 is in the range of 100 nm to 1 µm and an organic compound of which the surface tension at 20° C. is 35 mN/m or greater, and an ejection interval T1 after the base metal pigment ink composition is ejected from the first nozzle before the base metal pigment ink composition is ejected again from the first nozzle is within 100 µs.

Hereinafter, the ink jet recording apparatus according to the embodiment is described in a sequence of the ink composition and the apparatus.

1. INK COMPOSTION

The ink jet recording apparatus according to the embodiment has a base metal pigment ink composition as the ink composition thereof. The ink jet recording apparatus preferably further includes a color ink composition.

1.1. Base Metal Pigment Ink Composition
1.1.1. Pigment Dispersion Liquid The base metal pigment ink composition according to the embodiment can be obtained by using a pigment dispersion liquid as described below. The pigment dispersion liquid according to the embodiment is a pigment dispersion liquid for base metal pigment ink that contains a base metal pigment and an organic compound.

The base metal according to the invention may be a metal of which the ionization tendency is greater than that in hydrogen, and conceptually can include, for example, single metal substances such as alkali metal, alkali earth metal, aluminum, iron, zinc, lead, copper, nickel, cobalt, and chrome, and an alloy thereof.

The base metal pigment included in the pigment dispersion liquid according to the embodiment is preferably pigment particles configured with a material containing a base metal (hereinafter, pigment particles configured with material containing a base metal before surface treatment are referred to as "mother particles") subjected to the surface treatment with a fluorine-based compound.

Mother Particle

First, the pigment particle configured with a material containing base metals (mother particles) is described. The mother particle may be a material of which at least an area including a portion near the surface is configured with a base metal, or the whole portion of the mother particle may be configured with a base metal. In addition, the mother particle may have a base portion configured with non-metal material and a coating film configured with a base metal with which the base portion is coated.

The base metal that configures the mother particle is not particularly limited as long as the material is applicable to the aforementioned definition of the base metal. However, in view of glossiness securement and the cost, aluminum or an aluminum alloy is preferable. Here, the aluminum or the aluminum alloy has a problem in that if the aluminum or the aluminum alloy is dispersed in an organic solvent, the oxidation of the aluminum is facilitated, and thus the glossiness decreases and aluminum is aggregated with each other. With respect to the problems, if the base metal pigment subjected to the surface treatment with the fluorine-based compound is used, the oxidation of the base metal pigment can be effectively suppressed. Therefore, the decrease in the glossiness of the solvent can be suppressed and the dispersibility is considerably enhanced.

In addition, the mother particle may be manufactured by any method, but, for example, is preferably obtained by forming a film, formed with the base metal, on one surface of the sheet-shaped base material by using the evaporation method, and then releasing the film formed with base metal from the sheet-shaped base material and grinding the film. Instead of the evaporation method, an ion plating or a sputtering method may be used. According to the method, since a flat mother particle can be obtained, glossiness inherent to the mother particle can be effectively expressed.

As the sheet-shaped base material, for example, a plastic film such as one formed of polyethylene terephthalate can be used. In addition, in order to improve releasability, the film formation surface of the sheet-shaped base material may be coated with a release agent such as silicone oil or the releasable resin layer may be formed on the film formation surface. Examples of the resin used in the releasable resin layer include a cellulose derivative such as polyvinyl alcohol, polyvinyl butyral, polyethylene glycol, polyacrylic acid, polyacrylamide, and cellulose acetate butyrate, or a modified nylon resin. The releasing and the grinding are performed by applying ultrasonic waves to the film in a non-aqueous medium or applying external force by performing stirring with a homogenizer or the like.

In the method as described above, as the non-aqueous medium used when the releasing and the grinding are performed, alcohols such as methanol, ethanol, propanol, and butanol; a hydrocarbon-based compound such as n-heptane, n-octane, decane, dodecane, tetradecane, toluene, xylene, cymene, durene, indene, dipentene, tetrahydronaphthalene, decahydronaphthalene, and cyclohexylbenzene; an ether-based compound such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, propylene glycol monomethyl ether acetate, 1,2-dimethoxyethane, bis(2-methoxyethyl)ether, and p-dioxane; and a polar organic solvent such as propylene carbonate, γ-butyrolactone, N-methyl-2-pyrrolidone, N,N-dimethylformamide, N,N-dimethylacetamide, dimethyl sulfoxide, cyclohexanone, acetonitrile, and acryloyl morpholine can be suitably used. If such a non-aqueous medium is used, unintentional oxidation of the mother particle or the like is prevented, and variations in sizes, shapes, and characteristics between the respective particles can be reduced.

Particularly, as the non-aqueous medium used when the releasing and the grinding are performed, an organic compound of which the surface tension at 20° C. is 35 mN/m or greater) (preferably in the range of 37 mN/m to 45 mN/m) is preferably used. Accordingly, the more finely grinding can be performed while the characteristics of the mother particles are maintained. Therefore, the average particle diameter of the base metal pigment can be further decreased.

As the organic compound of which the surface tension at 20° C. is 35 mN/m or greater, for example, a heterocyclic compound such as lactone, a pyrrolidone derivative, cyclic amine, and cyclic ether are preferably used. The specific examples of heterocyclic compound of which the surface tension is 35 mN/m or greater include γ-butyrolactone, N-methyl-2-pyrrolidone, and acryloyl morpholine. If these organic compounds are contained in the base metal pigment ink composition below, the glossiness of the recorded image may be further enhanced.

According to the invention, the measurement of the surface tension can be measured by checking the surface tension when a platinum plate is wetted with the measuring object (organic compound, ink, or the like) under the environment of 20° C. by using an automatic surface tensiometer CBVP-Z (manufactured by Kyowa Interface Science Co., Ltd.).

In addition, since the average particle diameter and the average thickness of the mother particle are substantially the same as the average particle diameter and the average thickness of the base metal pigment below, the description thereof is omitted here.

Fluorine-Based Compound

Subsequently, the fluorine-based compound used in the surface treatment of the mother particle is described. As described above, the base metal pigment included in the pigment dispersion liquid according to the embodiment is preferably the mother particle subjected to the surface treatment with the fluorine-based compound. As the fluorine-based compound, a compound containing fluorine, and at least one selected from the group consisting of phosphorus, sulfur, and nitrogen, as constituent elements, can be preferably used. Specific examples thereof include fluorine-based phosphonate, fluorine-based carboxylate, fluorine-based sulfonate, and the salts thereof. If such a fluorine-based compound is used, the coating film can be formed by bonding a phosphonate group, a carboxy group, a sulfonate group, or the like to the surface of the mother particle. Since the oxidation of the base metal pigment can be effectively suppressed by using the base metal pigment coated with a single layer or plural layers containing the fluorine-based compound in the invention, the glossiness thereof in the organic solvent can be secured, and the dispersibility is considerably enhanced. Among these, fluorine-based phosphonate and the salts thereof are preferable since the bonding capability of the phosphonate group to the surface of the mother particle is particularly excellent.

The fluorine-based phosphonate and the salts thereof preferably have a structure expressed by Formula (1) below.

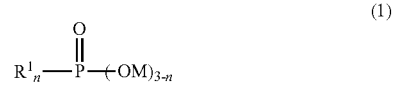

(1)

In Formula (1) above, $R^1$'s each is one group selected from structural formulas below, and M's each is a hydrogen atom, a hydrocarbon group, a univalent metal ion, an ammonium ion, or $-NR^2R^3R^4$. $R^2$, $R^3$, and $R^4$ are each represent a hydrogen atom or a $C_2H_4OH$ group, but a case in which $R^2$, $R^3$, and $R^4$ all are hydrogen atoms is excluded. n is an integer in the range of 1 to 3, m is an integer in the range of 1 to 12, and l is an integer in the range of 1 to 12.

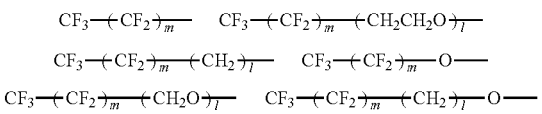

In Formula (1) above, m is an integer in the range of 1 to 12, but preferably an integer in the range of 1 to 8, and more preferably an integer in the range of 1 to 5. In addition, l is an integer in the range of 1 to 12, but preferably an integer in the range of 1 to 10, and more preferably an integer in the range of 1 to 6. If m and l are in the preferable range described above, the effects described above are more remarkably achieved.

As the fluorine-based phosphonate, a compound expressed by Formula (2) below is particularly preferable, since the balance between the absorbability to the surface of the mother particle and the enhancement in weatherability is excellent.

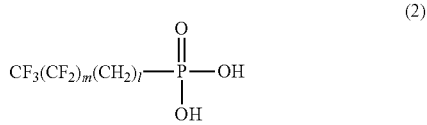

(2)

In Formula (2) above, m is an integer in the range of 1 to 12, but preferably an integer in the range of 1 to 8, and more preferably an integer in the range of 1 to 5. In addition, l is an integer in the range of 1 to 12, but preferably an integer in the range of 1 to 10, and more preferably an integer in the range of 1 to 6. If m and 1 are in the preferable range described above, the effects described above are more remarkably achieved.

The fluorine-based carboxylate and the salt thereof preferably have a structure expressed by Formula (3) below.

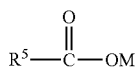
(3)

In Formula (3) above, $R^5$ is one group selected from the structural formulas below, and M is a hydrogen atom, a univalent metal ion, or an ammonium ion. m is an integer in the range of 1 to 12, but preferably an integer in the range of 1 to 8, and more preferably an integer in the range of 1 to 5. In addition, 1 is an integer in the range of 1 to 12, but preferably an integer in the range of 1 to 10, and more preferably an integer in the range of 1 to 6.

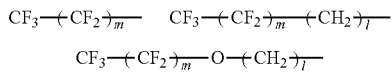

The fluorine-based sulfonate and the salts thereof preferably have a structure expressed by Formula (4) below.

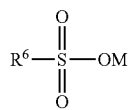
(4)

In Formula (4) above, $R^6$ is one group selected from the structural formulas below, M is a hydrogen atom, a univalent metal ion, or an ammonium ion. m is an integer in the range of 5 to 17, and 1 is an integer in the range of 1 to 12.

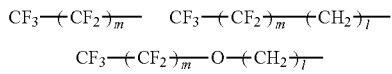

In addition, the fluorine-based compound preferably has a perfluoroalkyl group ($C_nF_{2n+1}$) in at least a portion of the structure thereof, and the number of carbon atoms in the perfluoroalkyl group is more preferably in the range of 1 to 6. If the fluorine-based compound has such a structure, the base metal pigment having excellent glossiness and dispersibility is easily obtained, and the weatherability when an image is recorded tends to be more excellent.

In addition, the molecular weight of the fluorine-based compound is preferably 1000 or less. If the fluorine-based compound adsorbed into the surface of the mother particle is, for example, a fluorine-based polymer disclosed in JP-A-2003-213157, JP-A-2006-169393, and JP-A-2009-215411, the coating film becomes too thick to decrease the glossiness, and the interaction between the base metal pigments in which the coating films are formed becomes strong so that the dispersibility is significantly decreased. Therefore, the film formed on the surface of the mother particle is preferably a monomolecular film formed of the fluorine-based compound having the molecular weight of 1000 or less.

Method of Manufacturing Pigment Dispersion Liquid

The pigment dispersion liquid according to the embodiment is manufactured, for example, as follows.

First, dispersion liquid is prepared by dispersing the mother particle described above in the non-aqueous medium. After the dispersion liquid is diluted with a homogeneous or a heterogeneous non-aqueous medium if necessary, ultrasonic waves are applied until the average particle diameter (D50) of the mother particle becomes 1 µm or less, and the grinding treatment is performed on the mother particle. The duration of the grinding treatment is not particularly limited, but is generally 3 hours to 24 hours. In addition, specific examples of the non-aqueous medium used in the dilution may include a non-aqueous medium which is the same as the aforementioned non-aqueous medium when the releasing and grinding is performed.

Subsequently, the coating film of the fluorine-based compound is formed on the surface of the mother particle by adding the fluorine-based compound to the dispersion liquid in which the mother particle subjected to the grinding treatment is dispersed in the non-aqueous medium and applying ultrasonic waves thereto. In this manner, the base metal pigment in which the surface of the mother particle is treated with the fluorine-based compound can be obtained. The addition amount of the fluorine-based compound is in the range of 1 part by mass to 50 parts by mass, preferably in the range of 2 parts by mass to 40 parts by mass, and more preferably in the range of 4.5 parts by mass to 30 parts by mass, with respect to 100 parts by mass of the mother particle. In addition, when the surface treatment is performed by applying ultrasonic waves, heating may be performed. The heating temperature is preferably 40° C. or higher. It is considered that the heating treatment forms a covalent bond between the surface of the mother particle and the fluorine-based compound, and thus the bonding strength is enhanced.

The surface treatment with the fluorine-based compound of the mother particle may be performed directly on the surface of the mother particle, or the treatment with the fluorine-based compound may be performed on the mother particle treated with an acid or a base, in advance. Accordingly, the chemical modification with the fluorine-based compound can be more securely performed on the surface of the mother particle so that the effects of the invention as described above can be more effectively achieved. In addition, even if the oxidation coating film is formed on the surface of a particle which is to be the mother particle before the surface treatment with the fluorine-based compound is performed, the oxidation coating film can be removed so that the surface treatment with the fluorine-based compound can be performed in a state in which the oxidation coating film is removed. Therefore, the glossiness of the manufactured base metal pigment can be caused to be excellent. As the acid, for example, proton acid such as hydrochloric acid, sulfuric acid, phosphoric acid, nitric acid, boric acid, acetic acid, carbonic acid, formic acid, benzoic acid, chlorous acid, hypochlorous acid, sulfurous acid, hyposulfurous acid, nitrous acid, hyponitrous acid, phosphorous acid, and hypophosphoric acid can be used. Meanwhile, as a base, for example, sodium hydroxide, potassium hydroxide, and calcium hydroxide can be used.

The product obtained up to this step can be used as the pigment dispersion liquid, but it is preferable to further perform the solvent substitution. A superfluous fluorine-based compound contained in the pigment dispersion liquid can be removed by performing solvent substitution. If the superfluous fluorine-based compound exists in the pigment dispersion liquid, the dispersibility of the base metal pigment may be decreased. As a specific method of the solvent substitution, the supernatant liquid is removed by centrifuging the above-obtained dispersion liquid containing the fluorine-treated base metal pigment, an appropriate amount of the non-aqueous medium to be substituted is added thereto, and the base metal pigment is dispersed in the substituted non-aqueous medium by applying ultrasonic waves thereto. In this manner, the pigment dispersion liquid in which the base metal pigment is dispersed can be obtained. In addition, the pigment dispersion liquid obtained in this manner is preferably further heated. It is assumed that the fluorine-based compound ion-bonded to the surface of the mother particle is dehydrated by heating to form a covalent bond, and the mother particle and the fluorine-based compound are more strongly bonded so that the effect according to the invention as described above is more effectively achieved. The heating temperature is preferably 50° C. or higher, and more preferably 60° C. or higher. The heat treatment duration is preferably in the range of 1 day to 10 days.

In addition, the non-aqueous medium used in the substitution is preferably the aforementioned organic compound (preferably, heterocyclic compound) of which the surface tension at 20° C. is 35 mN/m or greater.

In addition, surfactants may be further added to the non-aqueous medium used in the substitution. The surfactant that can be added to the non-aqueous medium is preferably a fluorine-based surfactant and/or a silicone-based surfactant. The content ratio of the surfactant in the non-aqueous medium is preferably 3% by mass or less, more preferably in the range of 0.01% by mass to 2% by mass, and particularly preferably 0.1% by mass to 1% by mass. If the content ratio of the surfactant is in the range described above, the dispersibility of the base metal pigment tends to be further enhanced. In addition, a function as the slipping agent is expressed when the image is recorded, and thus the effect in which the abrasion resistance of the image is enhanced may be obtained.

Examples of the fluorine-based surfactant include Megaface F-430, Megaface F-444, Megaface F-472SF, Megaface F-475, Megaface F-477, Megaface F-552, Megaface F-553, Megaface F-554, Megaface F-555, Megaface F-556, Megaface F-558, Megaface R-94, Megaface RS-75, and Megaface RS-72-K (above are all product names of products manufactured by DIC Corporation); EFTOP EF-351, EFTOP EF-352, EFTOP EF-601, EFTOP EF-801, and EFTOP EF-802 (above are all product names of products manufactured by Mitsubishi Materials Corporation); Ftergent 222F, Ftergent 251, and FTX-218 (above are all product names of products manufactured by Neos Company Limited); and Surflon SC-101 and Surflon KH-40 (above are all product names of products manufactured by AGC Semi Chemical Co., Ltd.).

Examples of the silicone-based surfactant include BYK-300, BYK-306, BYK-310, BYK-320, BYK-330, BYK-344, BYK-346, BYK-UV3500, and BYK-UV3570 (above are all product names of products manufactured by BYK Japan KK); and KP-341, KP-358, KP-368, KF-96-50CS, and KF-50-100CS (above are all product names of products manufactured by Shin-Etsu Chemical Co., Ltd.).

The content ratio of the base metal pigment in the pigment dispersion liquid according to the embodiment is not particularly limited, but is preferably in the range of 1% by mass to 10% by mass. If the content ratio of the base metal pigment in the pigment dispersion liquid is in the range described above, the dispersibility of the base metal pigment in the pigment dispersion liquid is easily enhanced, and the base metal pigment can be preserved for a long time. Physical properties of base metal pigment The shape of the base metal pigment contained in the pigment dispersion liquid according to the embodiment is a flat shape. If the shape of the base metal pigment is a flat shape, the light reflectivity becomes satisfactory so that the image having excellent glossiness can be recorded.

According to the invention, the flat shape may be a shape in which an area when observed from a predetermined angle (viewed from plane vision) may be larger than an area when being observed from a direction orthogonal to the viewing direction. Particularly, the ratio ($S_1/S_0$) of an area $S_1$ [$\mu m^2$] when being observed in the direction in which the projected area becomes maximized (viewed from plane vision) and an area $S_0$ [$\mu m^2$] when being observed in a direction in which an area when being observed becomes maximized, among the directions orthogonal to the viewing direction is preferably 2 or greater, more preferably 5 or greater, and particularly preferably 8 or greater. As the method of determining the value, for example, 10 arbitrary particles may be observed and an average value of values obtained by calculating the areas of the particles may be employed.

With respect to the base metal pigment contained in the pigment dispersion liquid (base metal pigment ink composition) according to the embodiment, the 50% average particle diameter D50 has to be in the range of 100 nm to 1 μm, is preferably in the range of 100 nm to 850 nm, is more preferably in the range of 100 nm or greater and less than 800 nm, is further more preferably in the range of 100 nm to 700 nm, is still further more preferably in the range of 100 nm to 600 nm, and is particularly preferably in the range of 100 nm to 550 nm. Since the D50 of the base metal pigment is in the range described above, the image having excellent glossiness can be recorded. In addition, if the D50 is in the range described above, the flowability of the base metal pigment in the ink jet recording apparatus becomes satisfactory. Therefore, even if the time interval at which the ink is ejected from a specific nozzle is short (within 100 μs), the ejection stability of the ink (waveform responsiveness) becomes excellent. Meanwhile, if the D50 exceeds 1 μm, the flowability of the base metal pigment decreases, and as a result, when the time interval in which the ink is ejected from the specific nozzle is short, the ejection stability of the ink decreases.

With respect to the base metal pigment contained in the pigment dispersion liquid (base metal pigment ink composition) according to the embodiment, a difference (D90−D10) between a 90% average particle diameter D90 and a 10% average particle diameter D10 is preferably in the range of 0.1 μm to 0.8 and more preferably in the range of 0.2 to 0.7 Here, a value of the difference (D90−D10) is an index indicating whether the monodispersity of the base metal pigment is satisfactory, and the monodispersity is evaluated to be more satisfactory when the value is smaller. If the value of the difference (D90−D10) is in the range described above, the arrangement of the base metal pigment on the recording medium becomes satisfactory, and the glossiness of the recorded image becomes excellent. In addition, since the flowability of the base metal pigment in the ink jet recording apparatus becomes satisfactory, even if the ejection interval is short, the ejection stability (waveform responsiveness) of the ink becomes satisfactory.

With respect to the base metal pigment contained in the pigment dispersion liquid (base metal pigment ink composition) according to the embodiment, the 90% average particle diameter D90 is preferably in the range of 0.3 μm to 1.2 μm, and more preferably in the range of 0.4 μm to 1.0 μm. Accordingly, the glossiness of the recorded image, and the ejection stability (waveform responsiveness) when the ejection interval is short become satisfactory.

With respect to the base metal pigment contained in the pigment dispersion liquid (base metal pigment ink composition) according to the embodiment, the 10% average particle diameter D10 is preferably in the range of 0.05 μm to 0.4 μm, and more preferably in the range of 0.1 μm to 0.3 μm. Accordingly, the glossiness of the recorded image, and the ejection stability (waveform responsiveness) of the ink when the ejection interval is short become satisfactory.

The light intensity distribution pattern of the diffracted scatter light is detected by using a laser diffraction particle size distribution measuring apparatus, and the light intensity distribution pattern thereof is calculated based on the light scattering theory to obtain volume-based particle size distribution. The average particle diameter according to the invention refers to a volume average particle diameter calculated from the particle size distribution. Examples of the laser diffraction particle size distribution measuring apparatus include Nanotrac UPA and Microtrac UPA (both are manufactured by Nikkiso Co., Ltd.).

Specifically, "D50", "D10", and "D90" respectively refer to a volume-based cumulative 50% volume average particle diameter (D50), a volume-based cumulative 10% volume average particle diameter (D10), and a volume-based cumulative 90% volume average particle diameter (D90) obtained using a dynamic light scattering method, and are values that can be obtained in the following manner. Particles in the dispersion medium are irradiated with light, and generated diffracted scatter light is measured by a detector disposed on the front, lateral, and rear sides of the dispersion medium. The particles which are originally amorphous particles are assumed to be spherical, the total volume of a group of particles which are converted into spheres having the same volume as that of the corresponding particles is set to be 100%, and a cumulative curve is obtained by using the measured values. At this time, a point at which the cumulative value becomes 50% is the 50% average particle diameter (D50), a point at which the cumulative value becomes 10% is the 10% average particle diameter (D10), and a point at which the cumulative value becomes 90% is the 90% average particle diameter (D90).

In addition, with respect to the base metal pigment contained in the pigment dispersion liquid (base metal pigment ink composition) according to the embodiment, the average thickness is preferably in the range of 1 nm to 100 nm, and more preferably in the range of 5 nm to 50 nm. If the average particle diameter D50 and the average thickness of the base metal pigment are in the range described above, when the base metal pigment is applied to an ink composition, an image having excellent smoothness of a coated film and excellent glossiness can be recorded. In addition, the pigment dispersion liquid can be productively manufactured, and unintentional deformation of the base metal pigment at the time of manufacturing the base metal pigment ink composition can be suppressed.

In addition, the average thickness can be obtained by photographing a lateral image of the base metal pigment using a transmission electron microscope (TEM) or a scanning electron microscope (SEM), and obtaining and averaging the thicknesses of 10 base metal pigments. As the transmission electron microscope (TEM), "JEM-2000EX" manufactured by JEOL Ltd. or the like is used, and as the scanning electron microscope, "S-4700" manufactured by Hitachi High-Technologies Corporation or the like is used.

1.1.2. Base Metal Pigment Ink Composition

The base metal pigment ink composition according to the embodiment is prepared by using the pigment dispersion liquid described above, and includes the base metal pigment and an organic compound of which the surface tension at 20° C. is 35 mN/m or greater (hereinafter, also referred to as "organic compound having specific surface tension").

The base metal pigment ink composition according to the embodiment may be an aqueous ink composition containing 50% by mass or more of water, or may be a solvent ink composition containing 50% by mass or more of an organic solvent. In addition, the base metal pigment ink composition according to the embodiment may be an active energy ray curing ink composition that is cured by the irradiation of an active energy ray. Examples of the active energy rays include infrared rays, ultraviolet rays, X rays, electron rays, and the like, and the ultraviolet ray or the electron ray are preferably used.

Base Metal Pigment

The content of the base metal pigment according to the embodiment is preferably 0.1% by mass to 5.0% by mass, more preferably in the range of 0.25% by mass to 3.0% by mass, and particularly preferably in the range of 0.5% by mass to 2.5% by mass, with respect to the total mass (100% by mass) of the base metal pigment ink composition.

Organic Compound Having Specific Surface Tension

The organic compound contained in the base metal pigment ink composition and having the specific surface tension may be a product derived from the non-aqueous solvent contained in the pigment dispersion liquid described above or a product newly added in the preparation of the base metal pigment ink composition.

The base metal pigment ink composition according to the embodiment contains the organic compound having the specific surface tension. Accordingly, since the leafing phenomenon of the base metal pigment easily occurs, the arrangement of the base metal pigment has been satisfactory even before the base metal pigment is dried, and thus the glossiness of the recorded image is enhanced. With respect to the organic compound having the specific surface tension, the surface tension at 20° C. is 35 mN/m or greater, and preferably in the range of 37 mN/m to 45 mN/m.

An example of the organic compound having the specific surface tension includes the heterocyclic compound described above. In addition, if the base metal pigment ink composition according to the embodiment is the active energy ray curing ink composition, an active energy ray polymerizable compound is included as the organic compound having the specific surface tension. The heterocyclic compounds and the active energy ray polymerizable compounds may be used singly, or may be used in combination.

The active energy ray polymerizable compound has a characteristic of being polymerized by the irradiation of the active energy ray singly or due to the action of the well-known photoinitiator (for example, acyl phosphine oxide compound) to cure the ink. As the active energy ray polymerizable compound, a monofunctional monomer containing a heteroatom in an alicyclic structure such as tris(2-(meth)acryloyloxyethyl)isocyanurate, γ-butyrolactone(meth) acrylate, N-vinylcaprolactam, N-vinylpyrrolidone, pentamethylpiperidyl (meth)acrylate, tetramethylpiperidyl(meth)acrylate, mevalonic acid lactone(meth)acrylate, (meth)acryloylmorpholine, and tetrahydrofurfuryl(meth)acrylate can be preferably used. In addition, a product containing the other active energy ray polymerizable compound may be used. Among such active energy ray polymerizable compounds, in view of the enhancement of the glossiness of the recorded image, products of which the surface tension at 20° C. is 35 mN/m or greater are preferably used. In the specification, (meth)acrylate means both acrylate and methacrylate, and (meth)acryloyl means both acryloyl and methacryloyl.

The content of the organic compound having the specific surface tension is preferably 5% by mass or greater, and more preferably in the range of 5% by mass to 40% by mass with respect to the total mass of the base metal pigment ink composition. If the content is 5% by mass or greater, the glossiness of the recorded image is further enhanced. Meanwhile, if the content is 40% by mass or less, the meniscus can be stably maintained, and stable and continuous ejection properties can be secured.

Organic Compound Not Having Specific Surface Tension

The base metal pigment ink composition according to the embodiment may contain an organic compound in which the surface tension is less than 35 mN/m (in the specification, referred to as "organic compound not having specific surface tension"). As the organic compound not having the specific surface tension, an organic solvent which is a liquid medium can be used. As a specific example, the non-aqueous medium (except for those in which the surface tension is 35 mN/m or greater) is included. Among these, the organic compound preferably contains one or more kinds of alkylene glycol ether which is liquid at normal temperature and pressure.

Examples of alkylene glycol ether include methyl, ethyl, n-propyl, i-propyl, n-butyl, i-butyl, hexyl, and aliphatics of 2-ethylhexyl, as well as ethylene glycol-based ethers and propylene glycol-based ethers which have each of allyl and phenyl groups having a double bond as a base group thereof. Since these examples are colorless, give out a little odor, and have an ether group and a hydroxyl group in their molecules, these examples have properties of both alcohols and ethers, and are liquid at normal temperature. In addition, the examples may have monoethers of which only an hydroxyl group on one side is substituted, or diethers of which hydroxyl groups on both sides are substituted, and plural kinds thereof may be used in combination.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

If the organic compound having the specific surface tension and alkylene glycol ether, of which the surface tension is lower than 35 mN/m are used in combination, the glossiness and the ejection stability thereof can become compatible.

If the base metal pigment ink composition according to the embodiment is a non-aqueous ink composition, the content of the alkylene glycol ether, of which the surface tension is less than 35 mN/m, is preferably in the range of 40% by mass to 95% by mass with respect to the total mass of the base metal pigment ink composition.

Resin

The base metal pigment ink composition according to the embodiment may contain a resin. Examples of the resin include an acryl resin, a styrene-acryl resin, a rosin-modified resin, a terpene-based resin, a polyester resin, a polyamide resin, an epoxy resin, a vinyl chloride resin, a vinyl chloride-vinyl acetate copolymer, a cellulose-based resin (for example, cellulose acetate butyrate, and hydroxypropyl cellulose), polyvinyl butyral, polyacryl polyol, polyvinyl alcohol, and polyurethane.

In addition, the non-aqueous emulsion-type polymer fine particles (Non Aqueous Dispersion: NAD) can be also used as the resin. These are dispersion liquids in which fine particles such as the polyurethane resin, the acryl resin, and the acryl polyol resin are stably dispersed in the organic solvent. Specific examples of commercially-available products include Sanprene IB-501 and Sanprene IB-F370 manufactured by Sanyo Chemical Industries, Ltd. as the polyurethane resin, and include N-2043-60MEX and N-2043-AF-1 manufactured by Harima Chemicals Group, Inc. as the acryl polyol resin.

The resins may be used singly or two or more types thereof may be used in combination.

The content (solid content) when the resin is contained is preferably in the range of 0.05% by mass to 10% by mass, more preferably in the range of 0.1% by mass to 5% by mass, and particularly preferably in the range of 0.15% by mass to 2% by mass, with respect to the total mass of the base metal pigment ink composition. If the content of the resin is in the range described above, the fixability of the base metal pigment to the recording medium is further enhanced.

Surfactant

At least one surfactant selected from the group consisting of a fluorine-based surfactant and a silicone-based surfactant may be further added to the base metal pigment ink composition according to the embodiment. The content of the surfactant is preferably 3% by mass or less, more preferably in the range of 0.01% by mass to 2% by mass, still more preferably in the range of 0.1% by mass to 1.5% by mass, and particularly preferably in the range of 0.1% by mass to 1.0% by mass, with respect to the total mass of the base metal pigment ink composition. If the content of the surfactant is in the range described above, the wettability of the base metal pigment ink composition to the recording medium is enhanced, and the fixability of the base metal pigment to the recording medium is further enhanced. In addition, the function as the slipping agent is expressed in the recorded image so that an effect in which the abrasion resistance of the image is enhanced can be obtained.

As the fluorine-based surfactant and the silicone-based surfactant, the products described above that can be added when the pigment dispersion liquid is prepared can be used. The surfactants may be used singly, or two or more types thereof may be used in combination.

Other Components

The base metal pigment ink composition according to the embodiment may contain components normally contained in the aqueous ink composition, the solvent ink composition, and the active energy ray curing ink composition, in addition to the components described above.

Method of Manufacturing Base Metal Pigment Ink Composition

A solvent-based ink composition according to the embodiment may be prepared in a well-known common method. For example, the solvent-based ink composition can be obtained by mixing and dissolving an organic compound, a resin, and an additive to obtain an ink solvent, adding the pigment dispersion liquid containing the base metal pigment described above to the ink solvent, and further performing mixing and stirring at normal temperature and pressure.

Physical Property of Base Metal Pigment Ink Composition

The viscosity of the base metal pigment ink composition according to the embodiment at 20° C. is preferably in the range of 2 mPa·s to 10 mPa·s, and more preferably in the range of 3 mPa·s to 5 mPa·s. If the viscosity of the base metal pigment ink composition at 20° C. is in the range described above, an appropriate amount of the base metal pigment ink composition is ejected from the nozzle so that the flight curvature or the scattering of the ink can be further reduced. Therefore, the base metal pigment ink composition can be properly used in the ink jet recording apparatus.

In the invention, the measurement of the viscosity can be performed by using a viscoelastic testing device MCR-300 (manufactured by Pysica), and by increasing shear rate to the range of 10 to 1,000 in the environment of 20° C., and reading the viscosity at the shear rate of 200.

In addition, the surface tension of the base metal pigment ink composition according to the embodiment at 20° C. is preferably in the range of 20 mN/m to 50 mN/m. If the surface tension is 20 mN/m or greater, the wetting-spreading or the bleeding of the base metal pigment ink composition to the surface of the recording head can be suppressed, and the ejection of the ink droplet can be satisfactorily performed. If the surface tension is 50 mN/m or less, the ink can be easily wetting-spread to the surface of the recording medium so that printing becomes satisfactory.

1.2. Color Ink Composition

The ink jet recording apparatus according to the embodiment preferably has a color ink composition further containing a colorant. In the same manner as the base metal pigment ink composition, the color ink composition may be an aqueous ink composition, may be a solvent ink composition, or may be an active energy ray curing ink composition.

Colorant

The colorant is a dye, or a pigment of which the 50% average particle diameter D50 is 400 nm or less.

As the dye, for example, various dyes used in a normal ink jet recording such as a direct dye, an acid dye, an edible dye, a basic dye, a reactive dye, a disperse dye, a vat dye, a soluble vat dye, and a reactive disperse dye can be used.

D50 of the pigment has to be 400 nm or less, but the pigment of which D50 is in the range of 50 nm to 400 nm is preferably used. If the pigment having D50 of 400 nm or less is used, the ejection stability of the color ink composition is enhanced.

As the pigment, a well-known pigment such as an inorganic pigment or an organic pigment can be used. The inorganic pigment is not limited to the below, and may be, for example, titanium oxide, iron oxide, calcium carbonate, barium sulfate, aluminum hydroxide, barium yellow, cadmium red, chrome yellow, carbon black, prussian blue, and metal powder.

The organic pigment is not limited to the below, and may be, for example, an azo pigment, a polycyclic pigment, a nitro pigment, a nitroso pigment, and aniline black. Among these, at least one of the azo pigment and the polycyclic pigment are preferable. Among these, the azo pigment is not limited to the below, and may be, for example, an azo lake, an insoluble azo pigment, a condensed azo pigment, and a chelate azo pigment. The polycyclic pigment is not limited to the below, but may be, for example, a phthalocyanine pigment, a perylene pigment, perynone pigment, an anthraquinone pigment, a quinacridone pigment, a dioxazine pigment, an indigo pigment, a thioindigo pigment, an isoindolinone pigment, a quinophthalone pigment, an azomethine-based pigment, and rhodamine B lake pigment. The pigments may be used singly, or two or more types thereof may be used in combination.

The content of the colorant can be appropriately set as desired, and may be, for example, in the range of 0.1% by mass to 10% by mass with respect to the total mass (100% by mass) of the color ink composition.

If a pigment is used as the colorant, in view of the enhancement of the dispersibility in the ink, the pigment may be a pigment subjected to the surface treatment or may be a pigment using a dispersant. The pigment subject to the surface treatment refers to a pigment that can be dispersed in an aqueous solvent by directly or indirectly combining a hydrophilic group (carboxyl group, sulfonate group, phosphonate group, and the like) to a pigment surface by a physical treatment or a chemical treatment (hereinafter, also referred to as "self-dispersion pigment"). In addition, the pigment using the dispersant refers to a product in which the pigment is dispersed by a surfactant or a resin (hereinafter, referred to as "polymer dispersion pigment"), and well-known materials can be used as both surfactant and resin. In addition, a pigment covered with the resin may be included in the "polymer dispersion pigment". The pigment covered with the resin can be obtained by an acid deposition method, a phase inversion emulsification method, and a mini-emulsion polymerization method.

Other Components

The color ink composition according to the embodiment contains generally used well-known components such as water, a resin, a surfactant, an organic solvent, an active energy ray polymerizable compound, according to the use thereof such as an aqueous ink composition for ink jet recording, a solvent ink composition, or an active energy ray curing ink composition.

Method of Manufacturing Color Ink Composition

The color ink composition according to the embodiment can be prepared by a well-known common method.

Physical Property of Color Ink Composition

The viscosity of the color ink composition according to the embodiment at 20° C. is preferably in the range of 2 mPa·s to 10 mPa·s, and more preferably in the range of 3 mPa·s to 5 mPa·s. If the viscosity of the color ink composition at 20° C. is in the range described above, an appropriate amount of the color ink composition is ejected from the nozzle so that the flight curvature or the scattering of the ink can be further reduced. Therefore, the color ink composition can be properly used in the ink jet recording apparatus.

In addition, the surface tension of the color ink composition according to the embodiment at 20° C. is preferably in the range of 20 mN/m to 50 mN/m. If the surface tension is 20 mN/m or greater, the wetting-spreading or the bleeding of the color ink composition to the surface of the recording head can be suppressed, and the ejection of the ink droplet can be satisfactorily performed. If the surface tension is 50 mN/m or less, the ink can be easily wetting-spread to the surface of the recording medium so that printing becomes satisfactory.

2. INK JET RECORDING APPARATUS 2.1. Apparatus Configuration

The ink jet recording apparatus according to the embodiment includes the base metal pigment and a first nozzle that ejects the base metal pigment. A more preferred embodiment of the ink jet recording apparatus according to the embodiment further includes the color ink composition and a second nozzle that ejects the color ink composition.

Hereinafter, the apparatus configuration of the ink jet recording apparatus according to the embodiment is described in detail with reference to the drawings. In addition, for better understanding of the structure of the ink jet recording apparatus according to the embodiment, scales may be appropriately changed.

FIG. 1 is a block diagram illustrating a configuration of an ink jet recording apparatus 1 (100) according to the embodiment. As illustrated in FIG. 1, the ink jet recording apparatus 1 (100) includes a transportation unit 10, a head unit 20, a detector group 60, and a controller 70. The ink jet recording apparatus 1 (100) that receives image data from an input section 80 to which the image data is input controls respective units by the controller 70. The controller 70 controls respective units based on the image data received from the input section 80, and records the image on a recording medium P. The state in the ink jet recording apparatus 1 (100) is monitored by the detector group 60, and the detector group 60 outputs the detection result to the controller 70. The controller 70 controls the respective units based on the detection result output from the detector group 60. The image data received by the ink jet recording apparatus 1 (100) from the input section 80 may be image data obtained by performing a process such as data conversion by the input section 80 on the image data input from another apparatus (not illustrated) to the input section 80.

Specifically, the controller 70 is a control unit (control portion) for controlling the ink jet recording apparatus 1 (100), and includes an interface portion 72, a CPU 74, a memory 76, and a unit control circuit 78. The interface portion 72 transmits and receives the data between the input section 80 and the ink jet recording apparatus 1 (100). The CPU 74 is an arithmetic processing device for performs overall control of the ink jet recording apparatus 1 (100). The memory 76 is to secure an area for storing a program of the CPU 74 and a working area, and includes a storage element such as RAM and EEPROM. The CPU 74 controls the respective units via the unit control circuit 78, according to the program stored in the memory 76.

The input section 80 is a section for inputting image data to be recorded in the recording medium P, and includes, for example, a PC or a touch panel-type input device. The input section 80 may include a function of performing data conversion on the image data input from another device. The input section 80 may be, for example, a PC in which a printer driver that controls the ink jet recording apparatus 1 (100) is installed. The image data input into the PC performs data processing for converting the data before the data processing (for example, image data in JPEG format) to data appropriate for performing recording on the recording medium P by the ink jet recording apparatus 1 (100) (for example, image data in dot format).

2.1.1. Serial Printer

Figure 2:
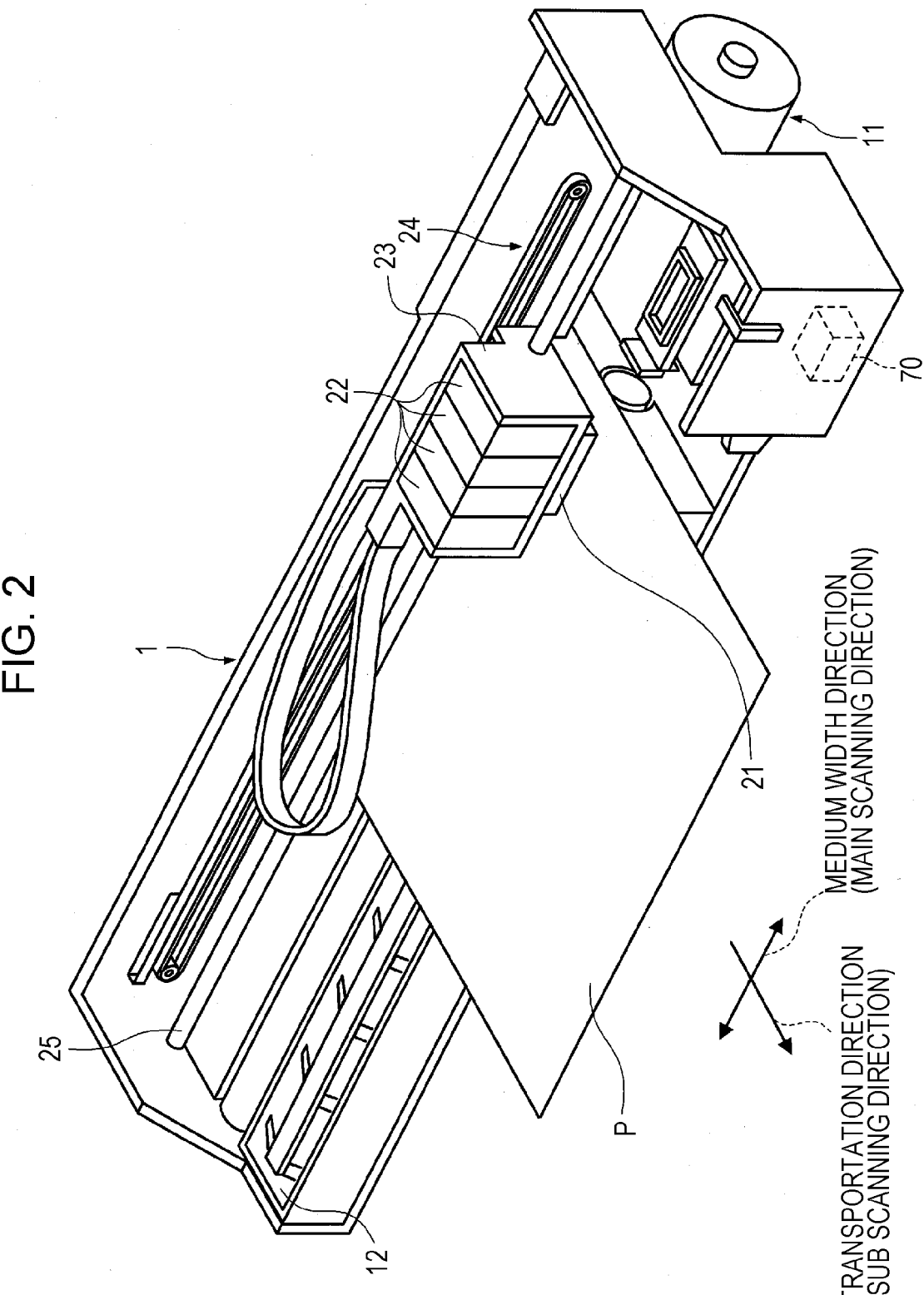
FIG. 2 is a diagram schematically illustrating a configuration of a serial printer which is an example of the ink jet recording apparatus according to the embodiment of the invention.

FIG. 2 is a perspective view schematically illustrating a structure of the ink jet recording apparatus 1, and an example in which the ink jet recording apparatus is a serial printer (serial-type ink jet recording apparatus). Hereinafter, the ink jet recording apparatus 1 illustrated in FIG. 2 is also called the serial printer 1. The serial printer refers to a printer including a mechanism in which a recording head is mounted on a carriage that performs scanning (moves) in a main scanning direction, and an ink droplet is ejected to a recording medium by the scanning (movement) of a recording head accompanied by the scanning (movement) of the carriage.

As illustrated in FIG. 2, the serial printer 1 includes a transportation mechanism 11 that transports the recording medium P in a transportation direction, a platen 12 that supports the recording medium P that is arranged on the lower side of a head 21, and transported, a carriage 23 on which the head 21 is mounted and on which an ink cartridge 22 is detachably mounted, and a carriage moving mechanism 24 that moves the carriage 23 in a medium width direction of the recording medium P. Further, the serial printer 1 has the aforementioned controller 70 that controls the overall operations of the printer 1. In addition, in FIG. 2, the medium width direction is a main scanning direction in which the head performs scanning, and the transportation direction is a direction intersecting the medium width direction (sub scanning direction).

Transportation rollers 11 and the platen 12 are examples of components of the transportation unit 10 in FIG. 1. The transportation roller 11 transports the fed recording medium P in response to an instruction from the controller 70 in the transportation direction. In addition, the platen 12 supports the transported recording medium P.

The recording head 21, the ink cartridge 22, the carriage 23, and the carriage moving mechanism 24 are examples of the components of the head unit 20, and form an image by ejecting droplets of ink to the recording medium P in response to the instruction from the controller 70.

The carriage 23 is installed in a state of being supported by a guide rod 25 that is a supporting member built in the medium width direction. The carriage 23 moves in the medium width direction along the guide rod 25 by the carriage moving mechanism 24, in response to the instruction from the controller 70. In addition, in the example of FIG. 2, the movement of the carriage 23 in the medium width direction is illustrated, but the invention is not limited thereto, and in addition to the movement of the medium width direction, a mechanism that moves in the transportation direction may be provided.

For example, the ink cartridge 22 can be configured with 4 independent cartridges. Each of the 4 cartridges is filled independently with the base metal pigment ink composition and the color ink compositions described above. In addition, in the example of FIG. 2, the number of cartridges is 4, but the number is not limited thereto, and a desired number of cartridges can be mounted. The ink cartridge 22 is not limited to a cartridge mounted on the carriage 23 as illustrated in FIG. 1, and, in substitution for this, for example, may be a cartridge that is mounted on a housing side of the serial printer 1 and supplies ink to the head 21 via an ink supplying tube.

The recording head 21 changes its own position with respect to the recording medium P in association with the movement of the carriage 23, and ejects the droplets of the ink from a predetermined nozzle in response to the instruction from the controller 70.

FIG. 3 is a diagram schematically illustrating a nozzle surface of the recording head 21. The plurality of nozzle arrays 27 are arranged on the nozzle surface which is an ink ejection surface. The plural nozzle arrays 27 have plural nozzles 26 for ejecting the ink in each nozzle array.

The plural nozzle arrays 27 can eject the ink having different compositions in each nozzle array. In the example of FIG. 3, 4 rows of nozzle arrays corresponding to the ink compositions are provided, and the respective nozzle arrays are arranged in the main scanning direction. Specifically, 4 nozzle arrays such as a nozzle array 27A that can eject the base metal pigment ink composition described above and a nozzle array 27B that can eject the color ink compositions described above are provided. In the example of FIG. 3, 4 rows of nozzle arrays are provided, but the invention is not limited thereto.

In the example of FIG. 3, the nozzle arrays 27A and 27B are respectively extended on the nozzle surface in the sub scanning direction intersecting the main scanning direction. However, the invention is not limited thereto, and the nozzle arrays 27A and 27B may be disposed to have an angle in a direction intersecting the main scanning direction on the nozzle surface.

The plural nozzles 26 are arranged in a predetermined pattern to form a nozzle array. According to the embodiment, the plural nozzles 26 are arranged on the nozzle surface in the sub scanning direction, but the invention is not limited thereto, and the plural nozzles 26 may be arranged, for example, on the nozzle surface to form a zigzag shape in a direction orthogonal to the main scanning direction. In addition, the number of nozzles 26 that configures the nozzle array is not particularly limited.

The plural nozzle arrays 27 can be used in a manner of being divided into plural areas including a predetermined number of nozzles 26 in the sub scanning direction. In the example of FIG. 2, the nozzle arrays 27A and 27B are configured with a first group on a upstream side T1 in the sub scanning direction and a second group on a downstream side T2 of the first group in the sub scanning direction. In addition, the number of nozzles 26 that configures one group is not particularly limited. In addition, the numbers of nozzles 26 that configures the groups may be the same with each other or may be different from one another in each nozzle array. In addition, the nozzle arrays may be used in a manner of being divided into three groups. If the nozzle arrays are used in a divided manner, the high speed of the recording can be achieved. In addition, if the nozzle arrays are used in a divided manner, the backfeeding of the recording medium may not be performed, or the number of times of the backfeeding of the recording medium can be reduced. Accordingly, the deviation of the printing position that can easily occur due to the backfeeding of the recording medium can be reduced.

The printer that performs recording by dividing the nozzle arrays ejects the color ink composition and the base metal pigment ink composition in the same scanning. Accordingly, in view of the increase in speed and the high definition of the image, the base metal pigment ink composition also strongly requires a performance of capable of being ejected at the same speed as the ejection speed of the color ink composition. Accordingly, the ink composition that can be ejected at a high speed and of which the droplet lands at the same speed as the ejection speed of the color ink composition is preferably used in a printer in which the nozzle arrays are divided to perform recording.

The serial printer 1 may include a heating mechanism (not illustrated) that heats the recording medium. As long as the heating mechanism is installed at a position that can heat the recording medium P, the installation position thereof is not particularly limited. The heating mechanism can be installed, for example, on the platen 12, and at a position facing the recording head 21. In this manner, if the heating mechanism is installed at a position facing the recording head 21, the attachment position of the droplet on the recording medium P can be surely heated so that the droplet attached to the recording medium P can be effectively dried.

As the heating mechanism, for example, a print heater mechanism that causes the recording medium P to come into contact with a heat source and heat the recording medium P, a mechanism that performs irradiation with an infrared ray, a microwave (electromagnetic wave having maximum wavelength of about 2,450 MHz), or the like, or a dryer mechanism that blows a hot air may be used. In addition, the overall conditions of the heating (for example, whether to perform heating, the timing of the heating, the heating temperature, or the heating time) are controlled by the controller 70.

If the active energy ray curing ink composition is used, the serial printer 1 may include an irradiation section (not illustrated) so as to cure the droplet of the ink attached to the recording medium.

The irradiation section may be installed in any position as long as the irradiation section can irradiate the ultraviolet ray curing ink composition attached to the recording surface with the active energy ray, and for example, the irradiation section may be provided on both ends of the recording head 21 in the main scanning direction.

The irradiation section includes a light source (not illustrated), and a light source control circuit (not illustrated) that controls whether to switching on or off the light source. As the light source, an ultraviolet ray emitting diode is preferably used. Accordingly, compared with the case where a mercury lamp, a metal halide lamp, the other lamps, and the like are used as the light source, the increase of the light source in size or in weight can be prevented. Therefore, the burden at the time of moving the carriage 23 can be reduced. In addition, when the ultraviolet ray emitting diode is used as the light source, the emission peak wavelength of the emitted ultraviolet ray may be in the range of 350 nm to 420 nm.

2.1.2. Line Printer

Figure 4A:
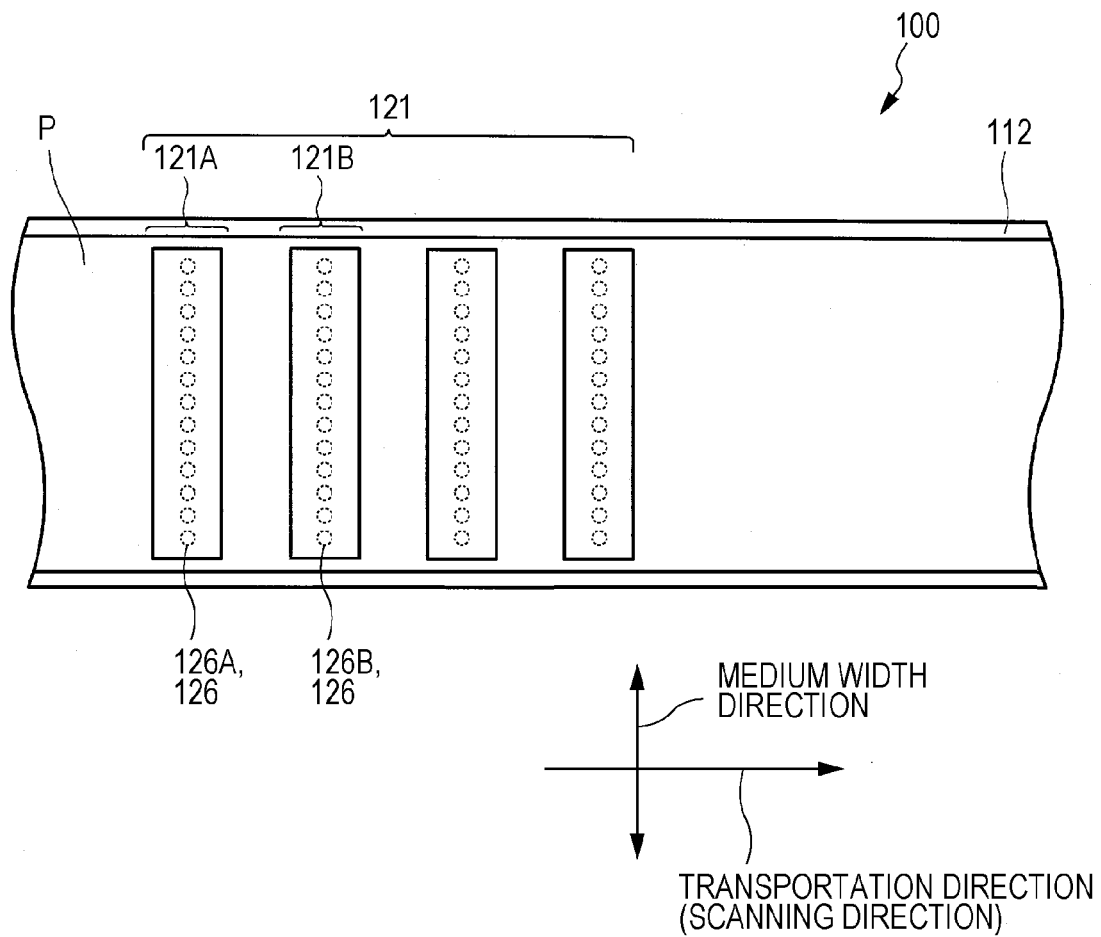
FIGS. 4A and 4B are diagrams schematically illustrating a configuration of a line printer which is an example of the ink jet recording apparatus according to the embodiment of the invention.
Figure 4B:
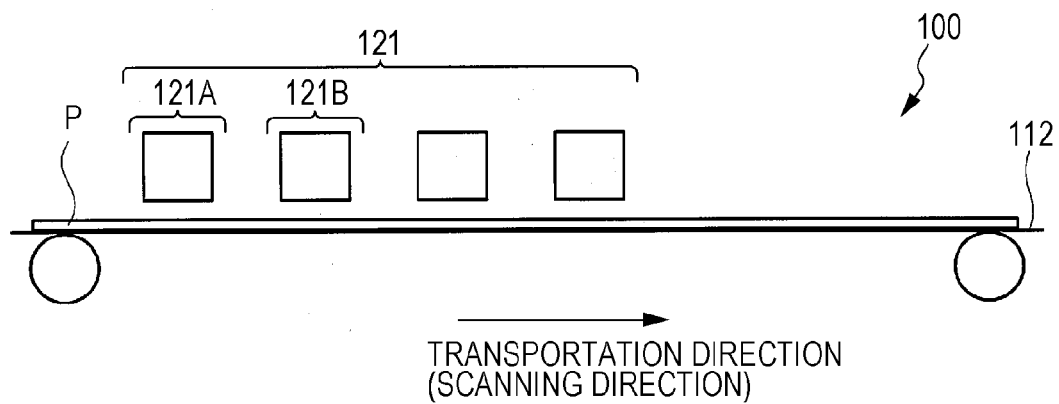

FIGS. 4A and 4B are diagrams schematically illustrating a portion of the structure when the ink jet recording apparatus 100 is viewed from the above, and an example in which the ink jet recording apparatus is a line printer (line-type ink jet recording apparatus). Hereinafter, the ink jet recording apparatus 100 illustrated in FIGS. 4A and 4B is called the line printer 100. The line printer refers to a printer including a mechanism in which one of the recording medium or the recording head is fixed and the other is scanned when the image is recorded, so that the droplet of the ink is ejected by the plural nozzles installed throughout the entire body in the medium width direction.

The ink used in the line printer that performs recording at an ultra high speed is preferably ink that can be stably ejected at a high speed. In addition, if the ink can be ejected at the same ejection speed as the color ink composition, the landing positions of the base metal pigment ink composition and the color ink composition can be matched, so that a brilliantly colored image of the high definition can be obtained. Accordingly, the base metal pigment ink composition according to the invention can be used in the line printer that scans the recording medium only in one direction.

FIG. 4A is a diagram schematically illustrating a portion near a recording area of the line printer 100 viewed from the above. In addition, FIG. 4B is a diagram schematically illustrating the recording area of the line printer 100 illustrated in FIG. 4A from one side. As illustrated in FIGS. 4A and 4B, the line printer 100 includes a platen 112 that transports the recording medium P in the transportation direction and a recording head 121 that extends in a medium width direction. In addition, though not illustrated, the controller 70 that controls the overall operations in the same manner as in the serial printer 1 of FIG. 2 is provided at an arbitrary position in the line printer 100.

The platen 112 is an example of components of the transportation unit 10 in FIG. 1. As long as the transportation unit 10 can transport the recording medium P, the transportation unit 10 is not limited to the platen 112, a well-known mechanism can be used. The platen 112 transports the fed recording medium P in the transportation direction in response to the instruction from the controller 70. In the example of FIGS. 4A and 4B, the platen 112 is self-driven so that the recording medium P supported by the platen 112 moves in the transportation direction.

The recording head 121 is an example of components of the head unit 20 in FIG. 1. The recording head 121 is formed in the width direction of the recording medium P. The recording head 121 ejects a droplet of the ink from a predetermined nozzle in response to the instruction from the controller 70. As illustrated in FIGS. 4A and 4B, the recording head 121 includes plural recording heads such as a first recording head 121A that ejects the base metal pigment ink composition and a second recording head 121B that ejects the color ink composition. Specifically, four recording heads are included in the example of FIGS. 4A and 4B, but the invention is not limited thereto, and two or more recording heads may be included.

In FIGS. 4A and 4B, the plural nozzles 126 including a first nozzle 126A are provided in the first recording head 121A. The plural nozzles 126 are arranged in the medium width direction. In addition, the plural nozzles 126 including a second nozzle 126B are arranged in the second recording head 121B in the medium width direction. In this manner, the first nozzle 126A and the second nozzle 126B are provided on different recording heads, and arranged in the transportation direction (scanning direction).

The line printer 100 may include a heating mechanism (not illustrated) that heats the recording medium. As long as the heating mechanism is provided at a position that can heat the recording medium P, the installation position is not particularly limited. For example, the heating mechanism may be installed on the lower side of the platen 112 and at a position facing the recording head 121. In this manner, if the heating mechanism is provided on a postion facing the head 121, the attachment position of the droplet on the recording medium P can be surely heated so that the droplet attached to the recording medium P can be effectively dried. The mechanism that can be used in the heating mechanism or the heating timing, and the control of the overall conditions of the heating are the same as those in the serial printer 1 described above. Therefore, the description thereof is omitted.

When the line printer 100 uses the active energy ray curing ink composition, the irradiation section (not illustrated) for curing the droplet of the ink attached to the recording medium may be included. The irradiation section is provided at any position as long as the irradiation section can irradiate the active energy ray curing ink composition attached to the recording surface with the active energy ray. For example, the irradiation section may be provided between recording heads such as a portion between the first recording head 121A and the second recording head 121B, or on the downstream side of the recording head on the downmost stream side. The irradiation section may be installed so as to perform irradiation along the medium width direction.

2.1.3. Others

In the ink jet recording apparatus 1 (100) according to the embodiment, the ejection interval T1 after the base metal pigment ink composition described above is ejected from the first nozzle 26A (126A) and before the base metal pigment ink composition described above is ejected from the first nozzle 26A (126A) is within 100 μs. The adjustment of the ejection interval is performed by the controller 70 described above. In the ink jet recording apparatus 1 (100) according to the embodiment, even if the ejection interval T1 is extremely short, the aforementioned base metal pigment ink composition is used, so that the ejection stability (waveform responsiveness) becomes excellent.

The ejection interval T1 is 100 μs or less, preferably in the range of 20 μs to 100 μs, more preferably in the range of 30 μs to 90 μs, and particularly preferably in the range of 40 μs to 80 μs. If the ejection interval T1 is 100 μs or less, the image can be recorded at a high speed. Meanwhile, if the ejection interval T1 is 20 μs or greater, the decrease of the ejection stability can be suppressed.

In addition, in the ink jet recording apparatus 1 (100), if the ejection interval after the color ink composition described above is ejected from the second nozzle 26B (126B) and before the color ink composition described above is ejected again from the second nozzle 26B (126B) is set to be T2, the ratio between the ejection intervals T1 and T2 (T1:T2) is preferably in the range of 0.7:1 to 1:0.7, and more preferably in the range of 0.8:0.9 to 0.9:0.8. In this manner, if the values of the ejection intervals T1 and T2 are close to each other, the base metal pigment ink composition and the color ink composition can be stably ejected by using a common driving waveform and the landing positions of the both can be easily controlled so that there is an advantage in that a high definition image can be simply recorded.

The diameter of a nozzle hole is preferably 30 μm or less, more preferably in the range of 15 μm to 30 μm, and particularly preferably in the range of 20 μm to 25 μm. If the diameter of the nozzle hole is in the range described above, the ejection stability of the ink becomes satisfactory.

As the ink jet recording apparatus according to the embodiment, the serial-type or line-type ink jet recording apparatus is used, but the ink jet recording method is not particularly limited, as long as the ink composition can be ejected as ink droplets from fine nozzle holes and attached to a recording medium. Examples of the ink jet recording method include a method of an electrostatic attraction type, a method of ejecting ink droplets by a pump pressure, a method of using the piezoelectric element, and a method of heating and foaming ink droplets by a microelectrode and ejecting ink droplets, and the like. Among these, a method of using a piezoelectric element can be preferably used.

In addition, the deformation shape of the piezoelectric element is not particularly limited, and may be any one of a longitudinal mode deformation, a shear mode deformation, and a bending mode deformation. Among these, in view of the realization of the high definition and the reduction of the size of the head, the ink is preferably ejected by performing the bending mode deformation. In addition, for the same reason, the thickness of the piezoelectric element is preferably 10 μm or less, more preferably 5 μm or less, and still more preferably 3 μm or less. The main component of the piezoelectric element is preferably one or more kinds selected from the group consisting of lead zirconate titanate, potassium sodium niobate, and bismuth ferrite oxide, and more preferably lead zirconate titanate.

2.2. Recording Medium

The recording medium P is not particularly limited, but in the ink jet recording method according to the embodiment, a low-ink-absorbable recording medium is preferably used.

Here, the "low-ink-absorbable recording medium" may be a recording medium in which the amount of the water absorption when 30 msec$^{1/2}$ has passed from the start of the contact in the Bristow method is 10 mL/m$^2$ or less, and at least a recording surface has the property. According to this definition, the "low-ink-absorbable recording medium" according to the invention also includes a non-ink-absorbable recording medium that does not absorb water at all. The Bristow method is a most common method of measuring a liquid absorption amount in a short time, and is adopted by Japan Technical Association of the Pulp and Paper Industry (JAPAN TAPPI). The details of the test method is described in Standard No. 51 "Paper and Paperboard-Liquid Absorbency Test Method-Bristow Method" of "Japan TAPPI Paper and Pulp Test Methods 2000".

Specific examples of the low-ink-absorbable recording medium includes a sheet, a film, a textile product, and the like containing the low absorbable material. In addition, the low-ink-absorbable recording medium may be a recording medium including a layer containing a low absorbable material (hereinafter, referred to as "low absorbable layer") on the surface of a base material (for example, paper, fiber, leather, plastic, glass, ceramics, and metal). The low absorbable material is not particularly limited, and may include an olefin-based resin, an ester-based resin, an urethane-based resin, an acryl-based resin, and a vinyl chloride-based resin. In addition, overall characteristics such as a thickness, a shape, a color, a softening temperature, hardness, and the like of the low-ink-absorbable recording medium are not particularly limited.

3. Examples

Hereinafter, the invention is described in detail based on the examples, but the invention is not limited thereto. A "Part" and "%" in the examples and the comparative examples are values based on mass, if not described otherwise.

3.1. Manufacturing of Base Metal Pigment Ink Composition 3.1.1. Preparation of Pigment Dispersion Liquid for Base Metal Pigment Ink The base metal pigment ink composition was prepared to manufacture the pigment dispersion liquid for base metal pigment ink. As a manufacturing method, a polyethylene telephthalate film having flat surfaces (arithmetical average surface roughness Ra was 0.02 μm or less) was first prepared.

Subsequently, cellulose acetate butyrate (butylation ratio of 35% to 39%) was applied to one entire surface of the film. Then, a film configured with aluminum (hereinafter, referred to as "aluminum film") was formed by using an evaporation method on the surface to which the cellulose acetate butyrate was applied.

Subsequently, a film on which an aluminum film was formed was put into a solvent presented in Table 1, and an ultrasonic wave was applied by using a homogenizer. Accordingly, a dispersion liquid of flat aluminum particles (particles to be mother particles) was obtained. The content of the aluminum particles in the dispersion liquid was 3.7% by mass.

Subsequently, with respect to 100 parts by mass of the aluminum particles, 20 parts by mass of 2-(perfluorohexyl) ethyl phosphonate was added to a dispersion liquid containing aluminum particles obtained as described above, ultrasonic waves were applied for 3 hours at 55° C. of the liquid temperature, and the surface treatment of the aluminum particles was performed. After the completion of the reaction, in a centrifuge (6000 rpm×30 minutes), centrifugal sedimentation was performed on aluminum particles subjected to the surface treatment, the supernatant portion was removed, the solvent presented in Table 1 was added, the ultrasonic wave was further applied so that the aluminum particles were dispersed again, and thus the dispersion liquid (re-dispersion liquid) in which the content of the aluminum particle was 3.7% by mass was obtained. The re-dispersion liquid was concentrated by an evaporator, and thus paste dispersion liquid (dispersion medium: solvent presented in Table 1) in which the content of the aluminum particle was 10% by mass was obtained. The average thickness of the aluminum particle obtained in this manner was 20 nm.

The obtained pigment dispersion liquids 1 to 6 for base metal pigment ink were used, the particle size distributions of the base metal pigments contained in the pigment dispersion liquids were measured by a particle size distribution meter (Product name: Microtrac MT-3200EX manufactured by Nikkiso Co. Ltd.), and the volume-based average particle diameters (D50, D90, and D10) were obtained.

The method of measuring the particle size distribution was as follows. First, 0.2 g of the dispersion liquid for base metal pigment ink (after surface treatment) obtained as described above was weighed, diethylene glycol diethyl ether was added, and thus the dispersion liquid was diluted to 200 times (Measurement process 1). Subsequently, diethylene glycol diethyl ether was circulated in the particle size distribution meter, and the diluted solution obtained in Measurement process 1 gradually added, until the detection sensitivity becomes the measurable range (Measurement process 2). Subsequently, the measurement was started in the condition presented in Table 2, and the particle size distribution was measured (Measurement process 3).

The average particle diameters of the base metal pigments obtained in this manner are presented in Table 1.

In addition, the surface tension of the used solvent at 20° C. were measured by the automatic surface tensiometer CBVP-Z (manufactured by Kyowa Interface Science Co., LTD.). The measurement results of the surface tensions of the respective solvents are presented in Table 1.

TABLE 1

| | | Pigment dispersion liquid for base metal pigment ink | | | | | |
|---|---|---|---|---|---|---|---|
| | | 1 | 2 | 3 | 4 | 5 | 6 |
| Base metal pigment | Kind of base metal pigment | Base metal pigment 1 | Base metal pigment 2 | Base metal pigment 3 | Base metal pigment 4 | Base metal pigment 5 | Base metal pigment 6 |
| | Average particle diameter D50 (μm) | 0.42 | 0.53 | 0.39 | 0.57 | 0.77 | 1.19 |
| | Average particle diameter D10 (μm) | 0.26 | 0.33 | 0.29 | 0.36 | 0.45 | 0.73 |
| | Average particle diameter D90 (μm) | 0.76 | 0.87 | 0.69 | 0.95 | 1.35 | 2.74 |

TABLE 1-continued

| | | Pigment dispersion liquid for base metal pigment ink | | | | | |
|---|---|---|---|---|---|---|---|
| | | 1 | 2 | 3 | 4 | 5 | 6 |
| Solvent | Kind of solvent | γ-butyrolactone | N-methyl pyrrolidone | Acryloyl morpholine | Dioxane | Diethylene glycol diethyl ether | Diethylene glycol diethyl ether |
| | surface tension (20° C.) | 43.9 | 41 | 44.6 | 37 | 23.3 | 23.3 |

TABLE 2

| Measurement condition of average particle diameter | |
|---|---|
| Refractive index | N/A |
| Shape | N/A |
| Density (g/cm$^3$) | — |
| Solvent | Diethylene glycol diethyl ether |
| Refractive index | 1.412 |
| Measurement time (s) | 30 |
| Loading index | — |
| Reflected light power (mV) | — |
| DV | 0.002488 |
| TR | 0.912939 |
| Filter | — |
| Sensitivity | — |
| Nano-range adjustment | — |
| Monodisperse | — |
| Calculation mode | MT3000 |
| Distribution | Volume | examples and the comparative examples were prepared. Specifically, the organic compounds and the surfactants were mixed and dissolved to obtain the ink solvents, the pigment dispersion liquids obtained as described above were added to the ink solvent and were further mixed and stirred in a magnetic stirrer for 30 minutes under normal temperature and pressure, and thus the base metal pigment ink compositions were obtained. The obtained base metal pigment ink compositions were put into the ink pack, and thus the base metal pigment ink compositions according to the examples and the comparative examples were obtained.

TABLE 3

| | | Example 1 | Example 2 | Example 3 | Example 4 | Example 5 | Example 6 | Comparative example 1 | Comparative example 2 | Reference example 1 |
|---|---|---|---|---|---|---|---|---|---|---|
| | Kind of ink composition | Base metal pigment ink 1 | Base metal pigment ink 2 | Base metal pigment ink 3 | Base metal pigment ink 4 | Base metal pigment ink 5 | Base metal pigment ink 6 | Base metal pigment ink 7 | Base metal pigment ink 7 | Black ink |
| Base metal pigment | Base metal pigment 1 | 1.2 | | | | 1.2 | | | | |
| | Base metal pigment 2 | | 1.2 | | | | | | | |
| | Base metal pigment 3 | | | 1.2 | | | 1.2 | | | |
| | Base metal pigment 4 | | | | 1.2 | | | | | |
| | Base metal pigment 5 | | | | | | | 1.2 | | |
| | Base metal pigment 6 | | | | | | | | 1.2 | |
| Colorant | Carbon black (Average particle diameter D50 = 100 nm) | | | | | | | | | 1.2 |
| Solvent (Organic compound) | γ-butyrolactone | 25 | | | | 50 | | | | |
| | N-methyl pyrrolidone | | 25 | | | | | | | |
| | Acryloyl morpholine | | | 25 | | | 50 | | | |
| | Dioxane | | | | 25 | | | | | |
| | Diethylene glycol diethyl ether | | | | | | | 25 | 25 | 25 |
| | Triethylene glycol monobutyl ether | 8 | 8 | 8 | 8 | 8 | 8 | 8 | 8 | 8 |
| | Cellulose acetate butyrate | 0.2 | 0.2 | 0.2 | 0.2 | 0.2 | 0.2 | 0.2 | 0.2 | 0.2 |
| | Diethylene glycol methyl ethyl ether | 65.2 | 65.2 | 65.2 | 65.2 | 40.2 | 40.2 | 65.2 | 65.2 | 65.2 |
| Surfactant | BYK-UV3500 | 0.4 | 0.4 | 0.4 | 0.4 | 0.4 | 0.4 | 0.4 | 0.4 | 0.4 |
| | Total (% by mass) | 100 | 100 | 100 | 100 | 100 | 100 | 100 | 100 | 100 |
| Evaluation result | Fixability | A | A | B | B | A | A | C | C | — |
| | Glossiness | A | B | A | B | A | B | C | C | — |
| | Waveform responsiveness 1 | A | A | A | A | A | A | B | C | A |
| | Waveform responsiveness 2 | A | A | A | B | A | A | C | C | A |
| | Waveform responsiveness 3 | A | B | A | B | A | A | C | C | A |

3.1.2. Preparation of Base Metal Pigment Ink Composition

In the compositions presented in Table 3, the respective base metal pigment ink compositions according to the Among the respective components described in Tables 3, the components presented by product names were as follows.
•BYK-UV3500: Product name, silicone-based surfactant manufactured by BYK Japan K.K.

3.2. Evaluation Test 3.2.1. Fixability

A reformed machine of an ink jet printer SC-570650 (Seiko Epson Corp.) was used in the evaluation test. An ink cartridge was manufactured by a cartridge exclusive for the product filled with the ink for evaluation. Subsequently, the obtained ink cartridge was mounted on a cyan array of the ink jet printer SC-570650, and commercially available ink cartridges were mounted on the other nozzle arrays. In addition, the mounted commercially available ink cartridges except for the ink cartridges mounted on the black array were used as dummies, and were not used in the evaluation of the example. Therefore, the ink cartridges did not influence on the advantage of the invention. In addition, a piezoelectric element having a film thickness of 2 μm in the bending mode deformation was used in the piezoelectric element of the ejection head of the printer. In addition, the main component of the piezoelectric element was lead zirconate titanate.

Subsequently, on Photoshop CS3, data was manufactured by setting C to be 80%, and the others to be 0%, the ink for evaluation mounted on the cyan array was ejected to a vinyl chloride media JT5829R (Product name, manufactured by MACtac) by using the printer, and thus a recorded matter on which a solid pattern image in a 5 cm square was printed was obtained.

Thereafter, when a printed surface of a printed matter left for 5 hours in a laboratory under the condition of room temperature (25° C.) was rubbed five times with cotton cloth under load of 500 g by using Color Fastness Rubbing Tester AB-301 (Product name: Tester Sangyo Co,. Ltd.), peeling state of the printed surface and the ink stain state on the cotton cloth was checked so that abrasion resistance (fixability) was evaluated. The evaluation criteria of the abrasion resistance were as follows.

A: Even if rubbing was performed five times, ink peeling or ink stain on cotton cloth were not recognized
B: After rubbing was performed five times, ink peeling or ink stain on cotton cloth were slightly recognized
C: After rubbing was performed five times, ink peeling or ink stain on cotton cloth were recognized 3.2.2. Glossiness The recorded matter was prepared on the same condition as the fixability test described above, glossiness of the obtained recorded matter at a flap angle of 60° was measured by using a gloss meter (Product name: "MULTI Gloss 268" manufactured by Konica Minolta, Inc.). The evaluation criteria of the glossiness of the obtained recorded matter were as follows.

A: Glossiness was 550 or greater
B: Glossiness was in the range of 450 to less than 550
C: Glossiness was in the range of 350 to less than 450

3.2.3. Waveform Responsiveness

The printer was prepared on the same condition as the fixability test described above, driving frequency was adjusted, and thus a recorded matter on which a solid pattern image in a 50 cm square was printed was obtained at an ejection interval of 125 microseconds (Waveform Responsiveness 1) which was about twice the normal driving frequency. The obtained image was evaluated by the criteria as follows. In addition, the ejection interval was changed to 83 microseconds and 42 microseconds and Waveform Responsiveness 2 and 3 was evaluated.

Further, in the waveform responsiveness test, the same test was performed by using black ink composition presented in Test 3 in order to compare the waveform responsiveness with general color ink.

A: can be used without problem in ink jet-type recording apparatus
B: was difficult to be used in ink jet-type recording apparatus
C: cannot be used in ink jet-type recording apparatus 3.2.4. Evaluation Result The results of the evaluation test were presented in Table 3.

TABLE 3

| | | Example 1 | Example 2 | Example 3 | Example 4 | Example 5 | Example 6 | Comparative example 1 | Comparative example 2 | Reference example 1 |
|---|---|---|---|---|---|---|---|---|---|---|
| | Kind of ink composition | Base metal pigment ink 1 | Base metal pigment ink 2 | Base metal pigment ink 3 | Base metal pigment ink 4 | Base metal pigment ink 5 | Base metal pigment ink 6 | Base metal pigment ink 7 | Base metal pigment ink 7 | Black ink |
| Base metal pigment | Base metal pigment 1 | 1.2 | | | | 1.2 | | | | |
| | Base metal pigment 2 | | 1.2 | | | | | | | |
| | Base metal pigment 3 | | | 1.2 | | | 1.2 | | | |
| | Base metal pigment 4 | | | | 1.2 | | | | | |
| | Base metal pigment 5 | | | | | | | 1.2 | | |
| | Base metal pigment 6 | | | | | | | | 1.2 | |
| Colorant | Carbon black (Average particle diameter D50 = 100 nm) | | | | | | | | | 1.2 |
| Solvent (Organic compound) | γ-butyrolactone | 25 | | | | 50 | | | | |
| | N-methyl pyrrolidone | | 25 | | | | | | | |
| | Acryloyl morpholine | | | 25 | | | 50 | | | |
| | Dioxane | | | | 25 | | | | | |
| | Diethylene glycol diethyl ether | | | | | | | 25 | 25 | 25 |
| | Triethylene glycol monobutyl ether | 8 | 8 | 8 | 8 | 8 | 8 | 8 | 8 | 8 |
| | Cellulose acetate butyrate | 0.2 | 0.2 | 0.2 | 0.2 | 0.2 | 0.2 | 0.2 | 0.2 | 0.2 |
| | Diethylene glycol methyl ethyl ether | 65.2 | 65.2 | 65.2 | 65.2 | 40.2 | 40.2 | 65.2 | 65.2 | 65.2 |
| Surfactant | BYK-UV3500 | 0.4 | 0.4 | 0.4 | 0.4 | 0.4 | 0.4 | 0.4 | 0.4 | 0.4 |
| | Total (% by mass) | 100 | 100 | 100 | 100 | 100 | 100 | 100 | 100 | 100 |
| Evaluation result | Fixability | A | A | B | B | A | A | C | C | — |
| | Glossiness | A | B | A | B | A | B | C | C | — |
| | Waveform responsiveness 1 | A | A | A | A | A | A | B | C | A |
| | Waveform responsiveness 2 | A | A | A | B | A | A | C | C | A |
| | Waveform responsiveness 3 | A | B | A | B | A | A | C | C | A |

As presented in Table 3, if ink containing the organic compound having the specific surface tension (solvent) and the base metal pigment in the specific range of the average particle diameter (D50) was used, it was found that the waveform responsiveness was satisfactory (Examples 1 to 6).

Meanwhile, if the ink that contains the base metal pigment in the specific range of the average particle diameter (D50)

but does not contain the organic compound having the specific surface tension (solvent) was used, it was found that the waveform responsiveness, the glossiness, and the fixability were decreased.

The invention is not limited to the embodiment as described above, but various modifications are possible. For example, the invention includes configuration which is substantially the same as that described in the embodiment (for example, configuration that has the same function, method, and result, or configuration that has the same purpose and advantage). In addition, the invention includes configuration in which a unessential portion in the configuration described in the embodiment is replaced. Also, the invention includes a configuration that achieves the same effect as the configuration described in the embodiment or a configuration that can achieve the same purpose. In addition, the invention includes the configuration described in the embodiment to which the well-known technique is added.

The entire disclosure of Japanese Patent Application No.: 2014-094416, filed May 1, 2014 is expressly incorporated by reference herein.

What is claimed is:

1. An ink jet recording apparatus, comprising:
   a base metal pigment ink composition; and
   a first nozzle that ejects the base metal pigment ink composition,
   wherein the base metal pigment ink composition contains a flat base metal pigment of which a 50% average particle diameter D50 is in a range of 100 nm to 1 μm, and an organic compound of which a surface tension at 20° C. is 35 mN/m or greater, and
   a controller that controls an ejection interval T1 after the base metal pigment ink composition is ejected from the first nozzle and before the base metal pigment ink composition is ejected again from the first nozzle is within 100 μs.

2. The ink jet recording apparatus according to claim 1, wherein a difference between a 90% average particle diameter D90 of the base metal pigment and a 10% average particle diameter D10 of the base metal pigment (D90–D10) is in a range of 0.1 μm to 0.8 μm.

3. The ink jet recording apparatus according to claim 1, wherein a 90% average particle diameter D90 of the base metal pigment is in a range of 0.3 μm to 1.2 μm.

4. The ink jet recording apparatus according to claim 1, further comprising:
   a color ink composition containing a colorant; and
   a second nozzle that ejects the color ink composition,
   wherein the colorant is a dye, or a pigment in which a 50% average particle diameter D50 is 400 nm or less, and
   wherein when an ejection interval after the color ink composition is ejected from the second nozzle and before the color ink composition is ejected again from the second nozzle is referred to as T2, a ratio between T1 and T2 (T1:T2) is in a range of 0.7:1 to 1:0.7.

5. The ink jet recording apparatus according to claim 1, wherein a diameter of the first nozzle is 30 μm or less.

6. The ink jet recording apparatus according to claim 1, wherein the ink jet recording apparatus is a line-type ink jet recording apparatus that causes one of a recording head or a recording medium to be fixed and scans the other so as to record an image on the recording medium, and
   wherein the first nozzle, and a second nozzle that ejects a color ink composition containing a colorant which is a dye, or a pigment having a 50% average particle diameter D50 of 400 nm or less are installed on different recording heads, and arranged in a direction of the scanning.

7. The ink jet recording apparatus according to claim 1, wherein the first nozzle, and a second nozzle that1 ejects a color ink composition containing a colorant which is a dye, or a pigment having a 50% average particle diameter D50 of 400 nm or less are installed on the same recording head,
   wherein the recording head includes a first nozzle array and a second nozzle array and performs scanning in a main scanning direction,
   wherein the first nozzle array contains the first nozzle, and a plurality of nozzles that eject the base metal pigment ink composition are arranged in a sub scanning direction intersecting the main scanning direction,
   wherein the second nozzle array contains the second nozzle, and a plurality of nozzles that eject the color ink composition are arranged in the sub scanning direction, and
   wherein the first nozzle array and the second nozzle array are used in a divided manner for every groups including a predetermined number of nozzles in the sub scanning direction.

8. The ink jet recording apparatus according to claim 1, wherein the organic compound is at least one of a heterocyclic compound and an active energy ray polymerizable compound.

9. The ink jet recording apparatus according to claim 1, wherein the content of the organic compound is 5% by mass or greater with respect to a total mass of the base metal pigment ink composition.

10. The ink jet recording apparatus according to claim 1, further comprising:
    a piezoelectric element that ejects the base metal pigment ink composition from the first nozzle; and
    a recording head that includes the first nozzle and the piezoelectric element,
    wherein the piezoelectric element performs a bending mode deformation and ejects the base metal pigment ink composition from the first nozzle.

* * * * *